United States Patent [19]

Batcheller et al.

[11] 4,425,620
[45] Jan. 10, 1984

[54] ELECTRICAL CONTROL FOR POWER SHIFT TRANSMISSION

[75] Inventors: Barry D. Batcheller, West Fargo; William E. Martinson, Fargo, both of N. Dak.

[73] Assignee: Steiger Tractor, Inc., Fargo, N. Dak.

[21] Appl. No.: 229,132

[22] Filed: Jan. 28, 1981

[51] Int. Cl.³ ...................... B06K 41/08; G06F 15/20
[52] U.S. Cl. .................................. 364/424.1; 74/866; 192/0.09; 192/3.28; 340/52 F
[58] Field of Search ............... 74/866, 867; 364/424.1; 192/0.052, 0.090, 0.092

[56] References Cited

U.S. PATENT DOCUMENTS

| | | | |
|---|---|---|---|
| 2,235,943 | 3/1941 | Mylius | 74/334 |
| 2,291,690 | 8/1942 | Caves | 192/0.01 |
| 2,610,518 | 9/1952 | Goedeke et al. | 74/365 |
| 2,658,403 | 11/1953 | Marco | 74/330 |
| 2,714,435 | 8/1955 | d'Ozouville | 192/3.5 |
| 2,752,020 | 6/1956 | Saives | 192/0.092 |
| 2,788,675 | 4/1957 | Hosea | 74/472 |
| 2,855,794 | 10/1958 | Faisandier | 74/472 |
| 2,952,346 | 9/1960 | Costa et al. | 192/0.092 |
| 3,333,485 | 8/1967 | Deli et al. | 74/479 |
| 3,335,830 | 8/1967 | de Coye de Castelet | 192/0.092 |
| 3,692,157 | 9/1972 | Arnold et al. | 192/0.098 |
| 3,783,962 | 1/1974 | Shaffer | 180/44 F |
| 3,805,640 | 4/1977 | Schneider et al. | 74/866 |
| 3,853,019 | 12/1974 | McAdams | 74/473 R |
| 3,955,437 | 5/1976 | Heintz | 74/473 R |
| 3,975,970 | 8/1976 | Elfes et al. | 74/473 R |
| 3,987,686 | 10/1976 | Paplaski | 74/476 |
| 4,015,488 | 4/1977 | Akeson et al. | 74/866 |
| 4,028,926 | 6/1980 | Heino et al. | 74/866 |
| 4,068,540 | 1/1978 | Beckerman | 74/476 |
| 4,069,900 | 1/1978 | Stamate | 192/4 A |
| 4,085,833 | 4/1978 | Papasideris | 192/4 B |
| 4,096,765 | 6/1978 | Cochran | 74/473 R |
| 4,137,792 | 2/1979 | Ceccano | 74/473 R |
| 4,198,882 | 4/1980 | Kiencke et al. | 74/866 |
| 4,262,335 | 4/1981 | Ahlen et al. | 364/424.1 |
| 4,312,248 | 1/1982 | Sugimoto et al. | 74/866 X |
| 4,314,340 | 2/1982 | Miki et al. | 364/424.1 |
| 4,361,060 | 11/1982 | Smyth | 74/866 |
| 4,373,619 | 2/1983 | Schritt et al. | 74/866 X |

Primary Examiner—Felix D. Gruber
Attorney, Agent, or Firm—Kinney, Lange, Braddock, Westman and Fairbairn

[57] ABSTRACT

An electrical control provides output signals to a group of solenoid valves which control the gear ratio selected by a transmission. The electrical control receives input signals from a mode select lever, an upshift/downshift pulser lever, an engine RPM sensor, a ground speed sensor, a clutch position sensor switch, and a throttle control lever. The mode select lever has a neutral (N) position, a reverse (R) position, a forward manual (FM) position, and a forward automatic (FA) position. Movement of the mode select lever from N to FM causes the electronic control to actuate solenoid valves which select a first forward gear. Similarly, movement of the lever from N to R causes the control to actuate solenoid valves which provide a first reverse gear. Higher/lower gears are obtained by moving the upshift/downshift pulser lever from its normal position to either an upshift position or a downshift position. One upshift pulse causes the electronic control to actuate solenoid valves resulting in one gear shift upward. Holding the pulser lever forward in the upshift position gives sequential upshifts at predetermined time intervals. Pulsing or holding the pulser lever rearward in the downshift position has a reverse effect. When the forward automatic mode is desired, the operator first moves the mode select lever to FM and operates the pulser lever until the desired maximum gear has been attained. The operator then moves the mode select lever from the FM to the FA position. Thereafter the control upshifts and downshifts the transmission according to engine RPM and the desired throttle set point.

34 Claims, 15 Drawing Figures

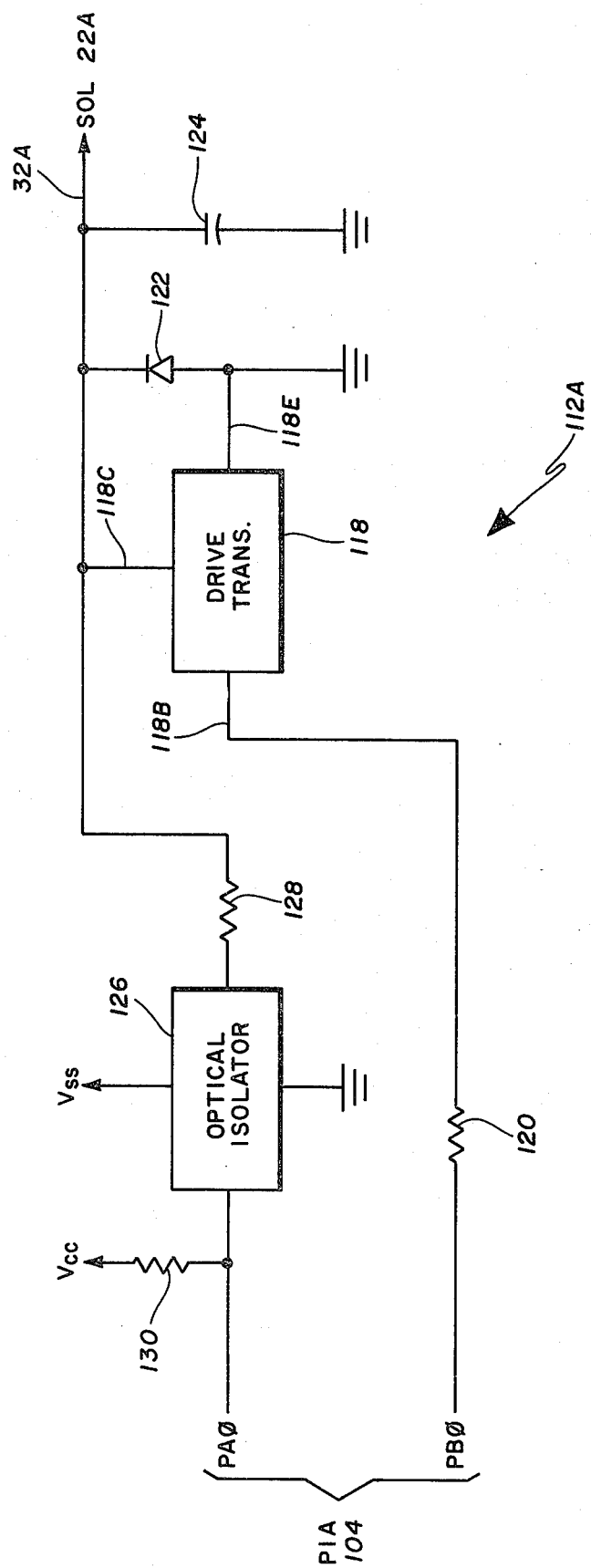

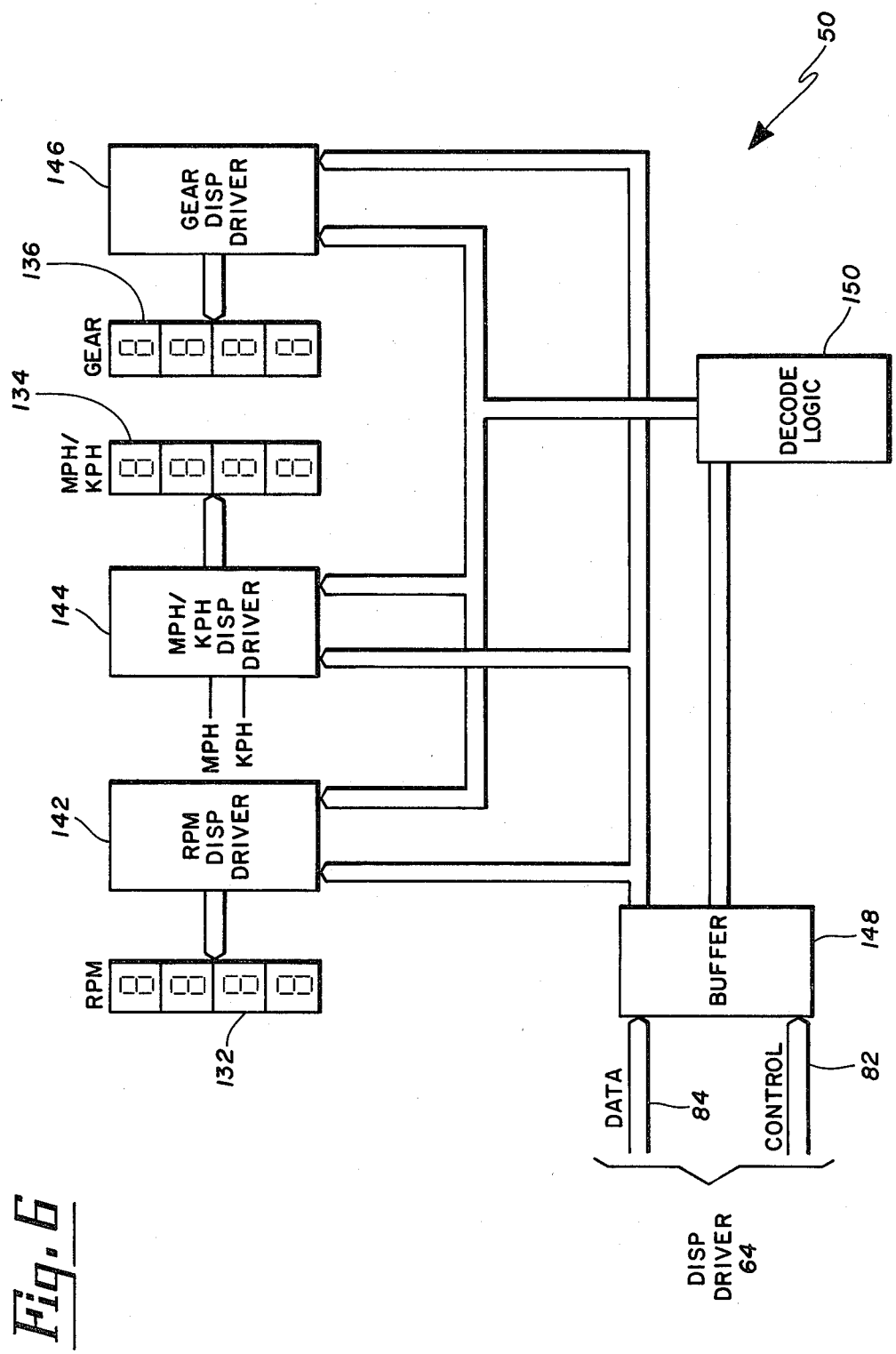

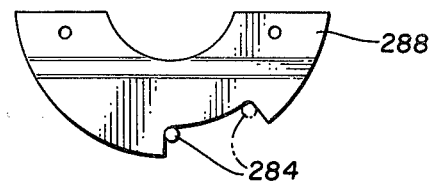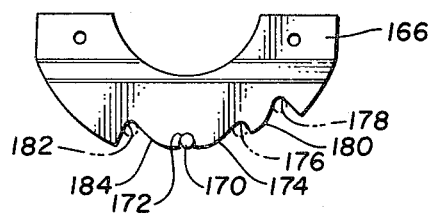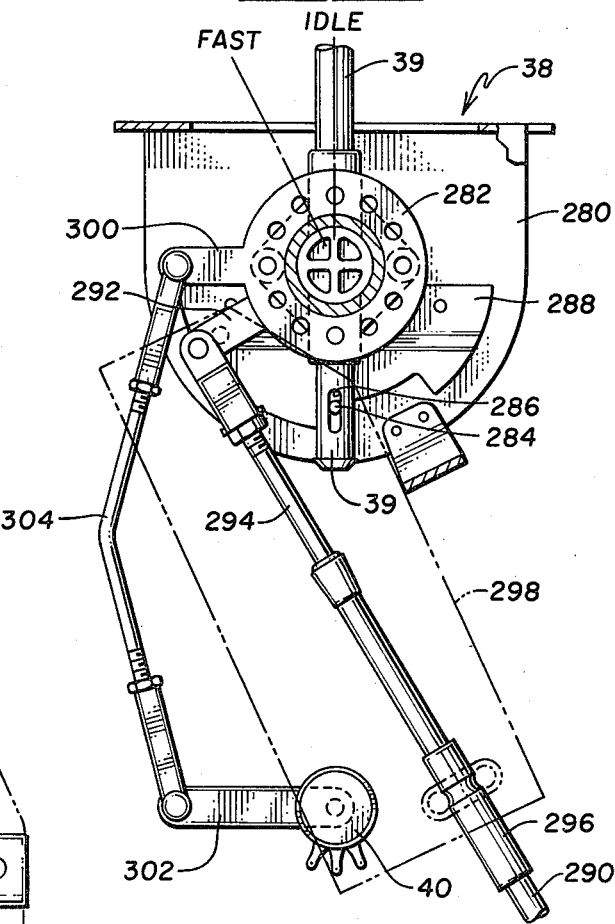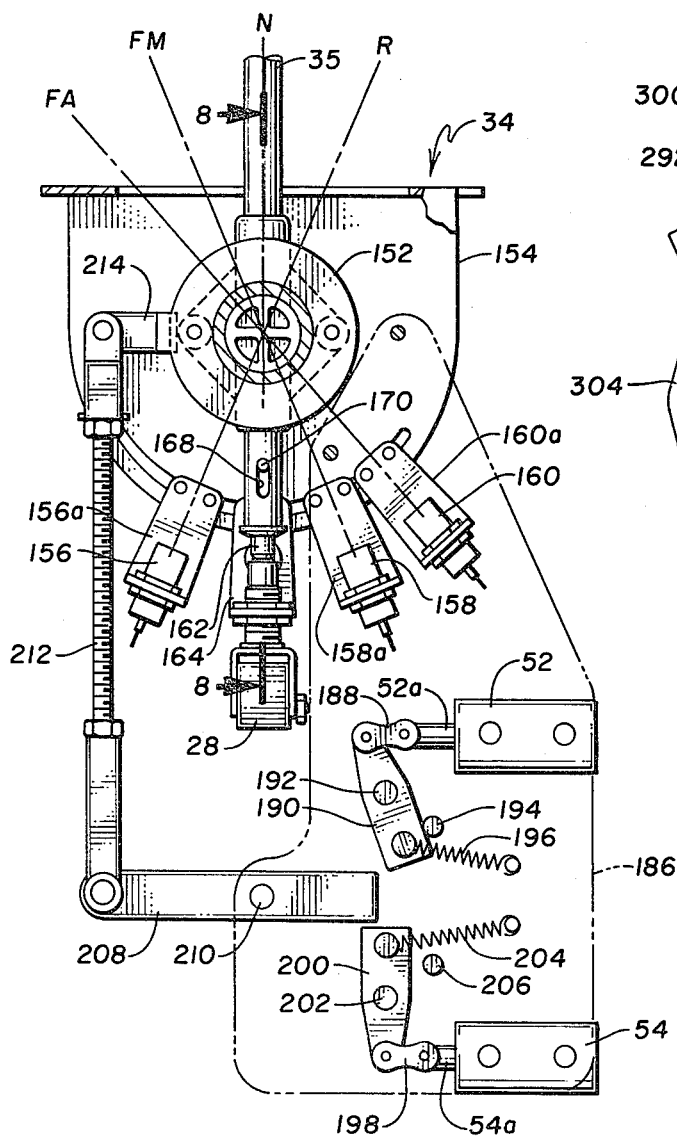

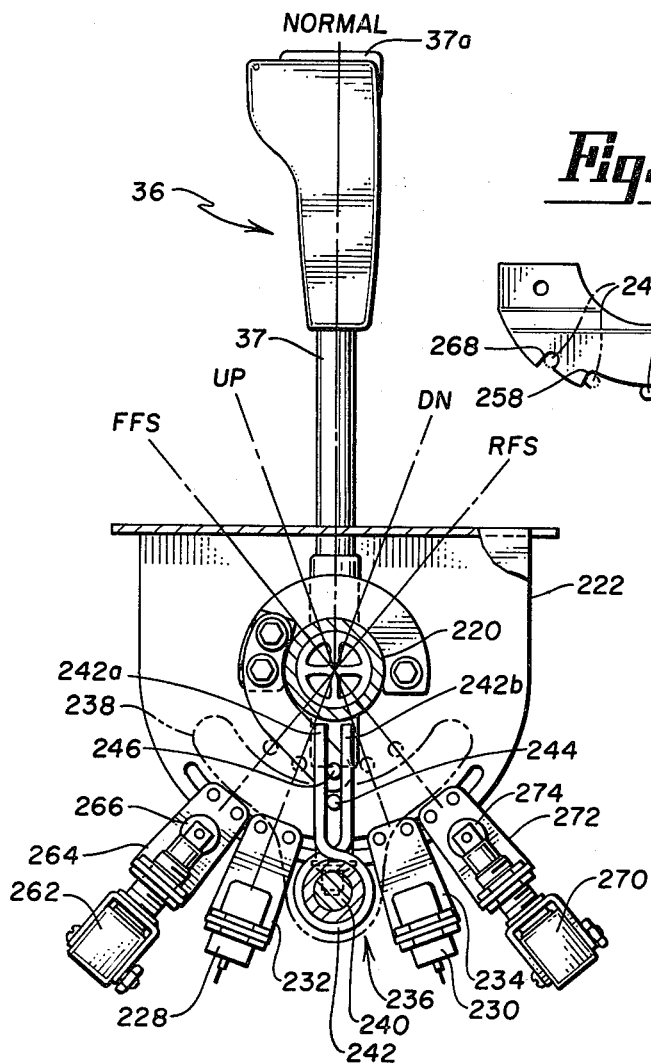

ELECTRICAL CONTROL FOR POWER SHIFT TRANSMISSION

BACKGROUND OF THE INVENTION

1. Field of the Invention

The present invention relates to electrical controls for transmissions of engine driven vehicles.

2. Description of the Prior Art

In the past, power transmissions have been developed in which the transmission gear ratios are selected by electrical signals provided to solenoid valves. These types of systems offer the potential of automatic electronic control of the gear ratios of the transmission. Examples of power transmission systems of this type are shown in U.S. Pat. Nos. 3,805,640 by Schneider, et al; 4,015,488 by Akeson et al; and 4,028,926 by Heino et al.

In large off-road vehicles, such as agricultural tractors, it is desirable to provide a large number of forward and reverse gear ratios. When large numbers of gear shift ratios are required, the prior art gear shift mechanisms become rather cumbersome or difficult for the driver of the vehicle to operate.

SUMMARY OF THE INVENTION

The present invention is an electrical control system for a vehicle of the type having an engine and a transmission with gear ratios which are selectable by electrical signals. The electrical control system includes mode select means for selecting among several operating modes of the transmission including forward, neutral, and reverse. The control system further includes upshift/downshift means which has a normal position, an upshift position, and a downshift position. Once the operating mode has been selected by the mode selection means, the upshift/downshift means provides electrical signals to the control depending upon the position of the upshift/downshift means. The control means provides electrical signals to the transmission which select the gear ratio of the transmission. These electrical signals are a function of the mode selected and the upshift and downshift signals provided by the upshift/downshift means.

In preferred embodiments of the present invention, the upshift/downshift means includes a lever and provides an upshift signal to the control means when the lever is moved to the upshift position. The upshift signal causes the control means to provide signals to the transmission which result in one gear shift upward. If the lever is maintained in the upshift position, sequential upshift signals are produced, which cause the control means to provide electrical signals to sequentially upshift the transmission. Similarly, pulsing the lever to the downshift position produces a downshift signal which results in one gear shift downward. Holding the lever in the downshift position produces a sequence of downshift signals which cause the control means to sequentially downshift the transmission.

The control system of the present invention also preferably includes a forward automatic mode, which is selectable by the mode select means. To operate in the automatic mode, the operator of the vehicle commences action in the forward manual mode, which is selected by the mode selection means, and uses the upshift/downshift means to select the desired maximum gear ratio. The operator then moves the mode select means to the position which selects the forward automatic mode. The control means monitors engine RPM and throttle position, and upshifts and downshifts the transmission to maintain a predetermined relationship between engine RPM and throttle position.

The control system of the present invention further includes, in preferred embodiments, a manually operated clutch. Clutch position sensor means senses movement of the clutch from its normal position, and power switch means senses when the clutch is fully actuated by the operator. The control means permits manual operation of the clutch to feather the drive system provided the transmission has a predetermined gear ratio (for example, the first forward or reverse gear). If other than the predetermined gear ratios are present, the control means immediately deenergizes the transmission whenever the clutch is actuated by the operator.

Depressing the clutch in any gear causes the control means to compare engine RPM and ground speed. Based on this comparison, the control means selects the appropriate gear ratio when the clutch is released.

In addition, the power switch means controls power supplied to the electrically controlled transmission, and deenergizes the transmission regardless of the selected gear ratio whenever the clutch is fully actuated by the operator.

BRIEF DESCRIPTION OF THE DRAWINGS

FIGS. 2 through 6 are electrical block diagrams illustrating, in further detail, portions of the transmission control system of FIG. 1.

FIG. 7 illustrates the mode select control of the transmission control system of FIG. 1.

FIG. 8 is a sectional view of the mode select control along section 8—8 of FIG. 7.

FIG. 9 is a view of a lock plate used in the mode select control of FIGS. 7 and 8.

FIG. 10 illustrates the upshift/downshift control of the transmission control system of FIG. 1.

FIG. 11 is a partially broken away side view of the upshift/downshift control of FIG. 10.

FIG. 12 illustrates a lock plate used in the upshift/downshift control of FIGS. 10 and 11.

FIG. 13 illustrates the throttle control of the transmission control system of FIG. 1.

FIG. 14 illustrates a lock plate used in the throttle control of FIG. 13.

DETAILED DESCRIPTION OF THE PREFERRED EMBODIMENTS

Figure 1:
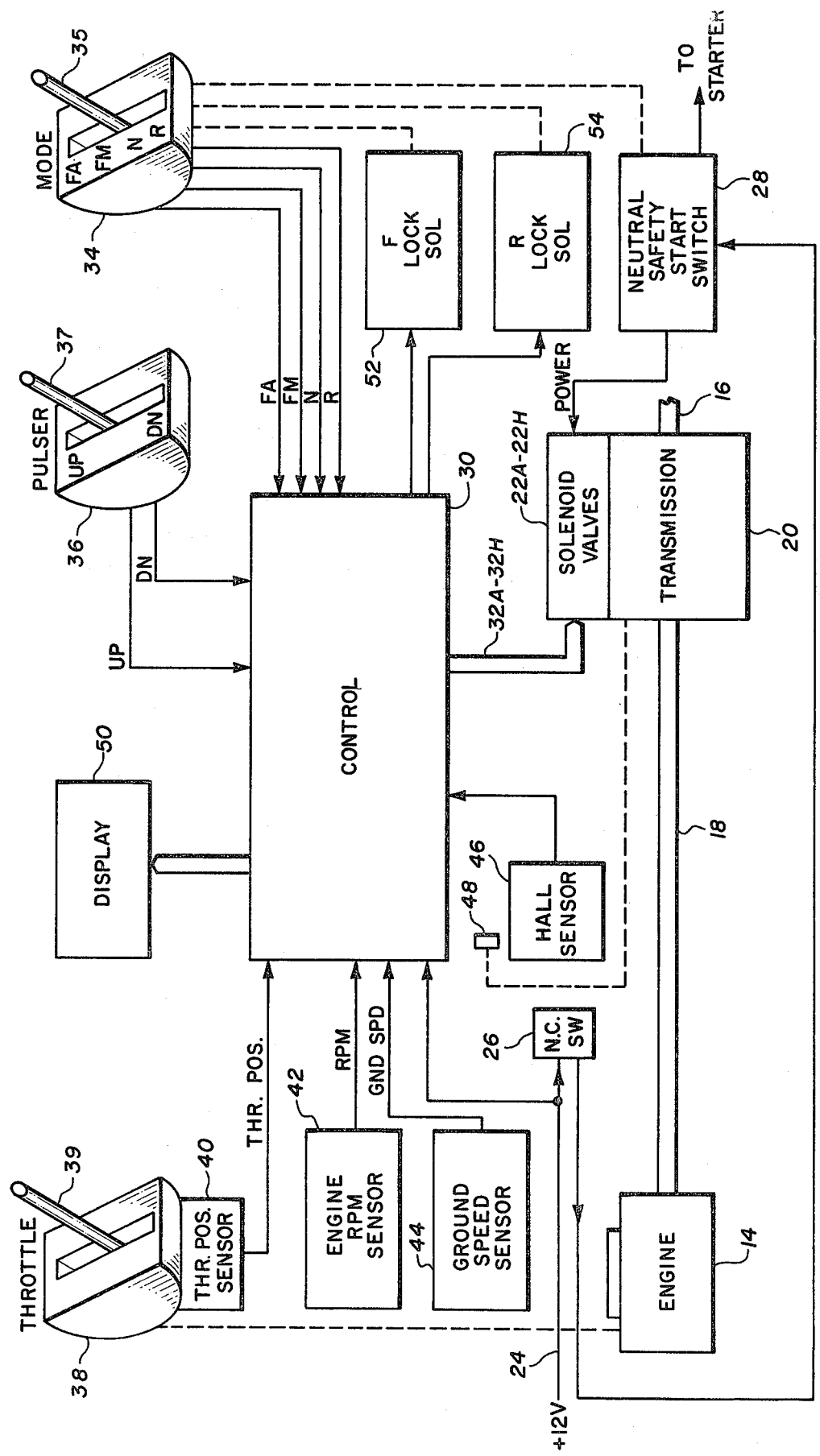
FIG. 1 is a block diagram illustrating the transmission control system of the present invention.

The Vehicle Drive of FIG. 1

In FIG. 1, a vehicle drive which utilizes the transmission control system of the present invention is illustrated. The vehicle drive includes internal combustion engine 14 which supplies the power to output drive shaft 16 through a drive train including shaft 18 and transmission 20. In the preferred embodiments of the present invention, transmission 20 is of a type which has a plurality of gear ratios which are selected by actuation of selected solenoid valves 22A–22H. In this preferred embodiment of the present invention, there are a total of eight solenoid valves 22A–22H, three of which must be actuated at any time to select a particular gear ratio. A total of twelve forward gear ratios, three reverse gear ratios, and neutral are provided by actuation of different groups of three solenoid valves.

Electrical power to all of the solenoid valves 22 is provided from +12 V supply line 24, through normally closed switch 26 and neutral safety start switch 28. Electrical control 30 selects the gear ratio of transmission 20 by selectively providing a ground connection through ground lines 32A-32H to solenoid valves 22A-22H.

The driver of the vehicle provides input signals to control 30 by means of mode select control 34, upshift-/downshift control 36, and throttle control 38.

Mode select control 34 has a mode select lever 35 which is movable to a neutral (N) position, a reverse (R) position, a forward manual (FM) position, and a forward automatic (FA) position. Electric signals are supplied from mode select control 34 to control 30 which cause control 30 to select the proper operating mode. Mode select lever 35 also controls neutral safety start switch 28. When mode select lever 35 is in the N position, it cause neutral safety start switch 28 to disconnect power from solenoid valves 22. At the same time, neutral safety start switch 28 provides the electrical power to starter circuitry (not shown) for starting engine 14. Mode select lever 35 and neutral safety start switch 28, therefore, ensure that transmission 20 is in neutral whenever lever 35 is in the neutral position, regardless of the state of ground lines 32.

Upshift/downshift control 36 has a pulser lever 37 which provides upshift and downshift pulses to control 30. Pulser lever 37 is spring biased to a normal position at which neither upshift nor downshift pulses are provided. When pulser lever 37 is moved forward, an upshift pulse is provided. If the driver maintains lever 37 in the upshift position, further upshift pulses will be produced at predetermined time intervals until lever 37 is released and returns to a normal position. Similarly, movement of pulser lever 37 rearward produces one or more downshift pulses, depending upon how long the driver holds lever 37 in its rearward position. The upshift and downshift pulses from upshift/downshift control 36 are used by control 30 to upshift or downshift transmission 20 when mode select lever 35 is in either the forward manual or reverse mode.

Throttle control 38 has a lever 39 which is mechanically linked to engine 14 to control the speed of engine 14. In addition, throttle position sensor 40 provides a throttle position signal to control 30.

In addition to the input signals from mode select control 34, upshift/downshift control 36, and throttle control 38, control 30 also receives input signals from engine RPM sensor 42, ground speed sensor 44, and Hall effect clutch position sensor 46. In the preferred embodiment shown in FIG. 1, clutch pedal 48 is mechanically linked to transmission 20 and permits the operator to disengage engine 14 from transmission 20 and drive shaft 16. Sensor 46 senses whenever clutch pedal 48 is depressed from its normal position. In addition, when clutch 48 is fully depressed, clutch 48 actuates normally closed switch 26, thus breaking the supply of power from +12 V supply line 24 to solenoid valves 22A-22H.

In addition to controlling the state of ground lines 32A-32H, and thus the state of solenoid valves 22A-22H, control 30 also supplies output signals to display 50. In the preferred embodiments of the present invention, display 50 displays information of use to the driver, such as engine RPM, vehicle speed (in either miles per hour or kilometers per hour), the present gear selected by control 30, and (in the case of the forward automatic mode) the maximum gear selected by the driver.

Control 30 also provides signals which control front and rear lock solenoids 52 and 54. When a forward gear is selected and ground speed rises above a predetermined level (for example, one mile per hour), control 30 actuates reverse lock solenoid 54 to prevent the operator from moving the mode select lever 35 to the reverse (R) position. Control 30 maintains reverse lockout solenoid 54 in an actuated state until the ground speed, as indicated by the signal from ground speed sensor 44, drops below one mile per hour. Similarly, control 30 actuates forward lockout solenoid 52 when mode select lever 35 is in the reverse (R) position and ground speed is above one mile per hour. In addition to the physical lockout feature provided by forward and reverse lockout solenoids 52 and 54, control 30 also electronically inhibits a forward-to-reverse transition or a reverse-to-forward transition whenever ground speed is above one mile per hour.

The operation of the system of FIG. 1 in the manual mode is generally as follows. The engine is started with mode select lever 35 in the neutral (N) position. Neutral safety start switch 28 disconnects power to solenoid valves 22 and provides power to the starter circuit. Transmission 20, therefore, is in neutral, since all of the solenoid valves 22 are deenergized.

When the driver moves the mode select lever 35 from N to FM, control 30 actuates the selected solenoid valves (22A-22H) which provide the first forward gear. Clutch pedal 48 permits manual modulation of transmission 20 so the driver can feather the drive. Modulation by means of clutch pedal 48 is only possible in the first forward gear, and the first reverse gear. The first reverse gear is obtained when mode select lever 35 is moved from N to R.

Gears higher than the first forward gear are obtainable by moving the pulser lever 37 to the upshift position. One movement of pulser lever 37 to the upshift position provides a single upshift pulse. Control 30 receives the upshift pulse and changes the solenoid valves 22A-22H which are actuated so as to produce a shift to the next higher gear. Holding pulser lever 37 forward results in the production of a sequence of upshift pulses at predetermined time intervals. This results in a sequential upshift of transmission 20 until lever 37 is released or the highest gear is attained.

Pulsing or holding pulser lever 37 rearward in the downshift position gives the reverse effect. One or more downshift pulses are provided to control 30, which cause control 30 to change the particular solenoid valves 22A-22H which are actuated to produce downshifting of transmission 20. When mode select lever 35 is in the FM position, control 30 permits pulser lever 37 to upshift and downshift transmission 20 between the first forward gear and the highest forward gear. Control 30 does not permit downshifting from first forward gear to either neutral or reverse by means of pulser lever 37. A shift from FM to either N or R can be achieved only by use of mode select lever 35.

When mode select lever 35 is placed in the R position, control 30 actuates the proper solenoids 22A-22H to provide first reverse gear. Gears "lower" (i.e. reverse gears with a higher ratio) than the first reverse gear are obtained by pulsing or holding pulser lever 37.

Gears above the first forward gear or below the first reverse gear cannot be modulated by clutch 48. Depressing clutch pedal 48 causes clutch position sensor 46 to provide a signal to control 30. If transmission 20 is not in first forward or reverse gear, control 30 immediately deenergizes all solenoid valves 22A-22H. In other words, the depressing of clutch 48 causes transmission 20 to be shifted to neutral. Depressing clutch 48 in any gear causes control 30 to compare engine RPM and ground speed and to select the appropriate gear when the clutch pedal 48 is released.

If the vehicle (for example, an agricultural tractor) is free-wheeling on a road when clutch 48 is depressed by the driver, control 30 deenergizes valves 22A-22H and the vehicle begins to coast. As the vehicle begins to slow down and clutch pedal 48 remains depressed, control 30 continues to compare engine RPM and ground speed and continues to downshift electronically. When the clutch pedal is released, control 30 energizes particular solenoids 22A-22H so that the selected gear most closely matches engine RPM and ground speed. Control 30 also preferably updates the gear being displayed on display 50, so that the driver can see that a lower gear will be selected as soon as he releases clutch pedal 48.

Another common situation is when the tractor is in the field and is pulling a plow or other draft implement. In this case, as soon as the driver depresses clutch 48, the tractor will stop due to the drag of the implement. When clutch pedal 48 is released, control 30 actuates solenoid valves 22A-22H to provide the first forward gear. This is desirable since the first forward gear can be modulated by using clutch 48. This feature of the present invention is particularly advantageous in permitting the driver to stop the tractor immediately upon observing an obstacle and to inch around the obstacle, all by use of the clutch pedal 48.

The transmission control system of FIG. 1 also provides operation in a forward automatic mode. In this mode, control 30 controls the gear ratio of transmission 20 as a function of engine RPM, throttle position, and a maximum forward gear selected by the driver.

To select the maximum forward gear in the forward automatic mode, the driver first places mode select lever 35 in the forward manual (FM) position. Control 30 controls solenoid valves 22A-22H to provide the first forward gear. The operator then pulses or holds pulser lever 37 forward to upshift transmission 20 until the maximum desired gear ratio is attained. At that time, the operator then moves mode select lever 35 from the FM to the FA position. By moving lever 35 to the FA position, the driver informs control 30 that gear shifts are allowed automatically. The current gear setting is stored in control 30 as the maximum gear setting. While select lever 35 is in FA position, control 30 is allowed to shift automatically to any gear from the maximum gear setting down to first forward gear. Gear shifts above the maximum gear ratio or below the first forward gear are not permitted.

In the forward automatic mode, control 30 receives the throttle position signal from throttle position sensor 40 and the RPM signal from engine RPM sensor 42. Control 30 has stored information indicating the engine RPM which corresponds to the particular throttle position when the vehicle is in an unloaded state. In the event that engine RPM begins to lag behind the throttle setting, control 30 downshifts transmission 20 until the measured engine RPM increases to match the throttle set point. This comparison of throttle set point and engine RPM is performed continually by control 30, and transmission 20 is upshifted and downshifted between the first forward gear and the maximum gear set by the driver in order to maintain the desired relationship between engine RPM and throttle position set point.

In a preferred embodiment of the present invention, display 50 displays both the maximum gear setting and the actual gear selected by control 30 when the transmission control system is in the forward automatic mode. This permits the driver to compare at any time the maximum gear which has been set and the current gear.

Figure 2:
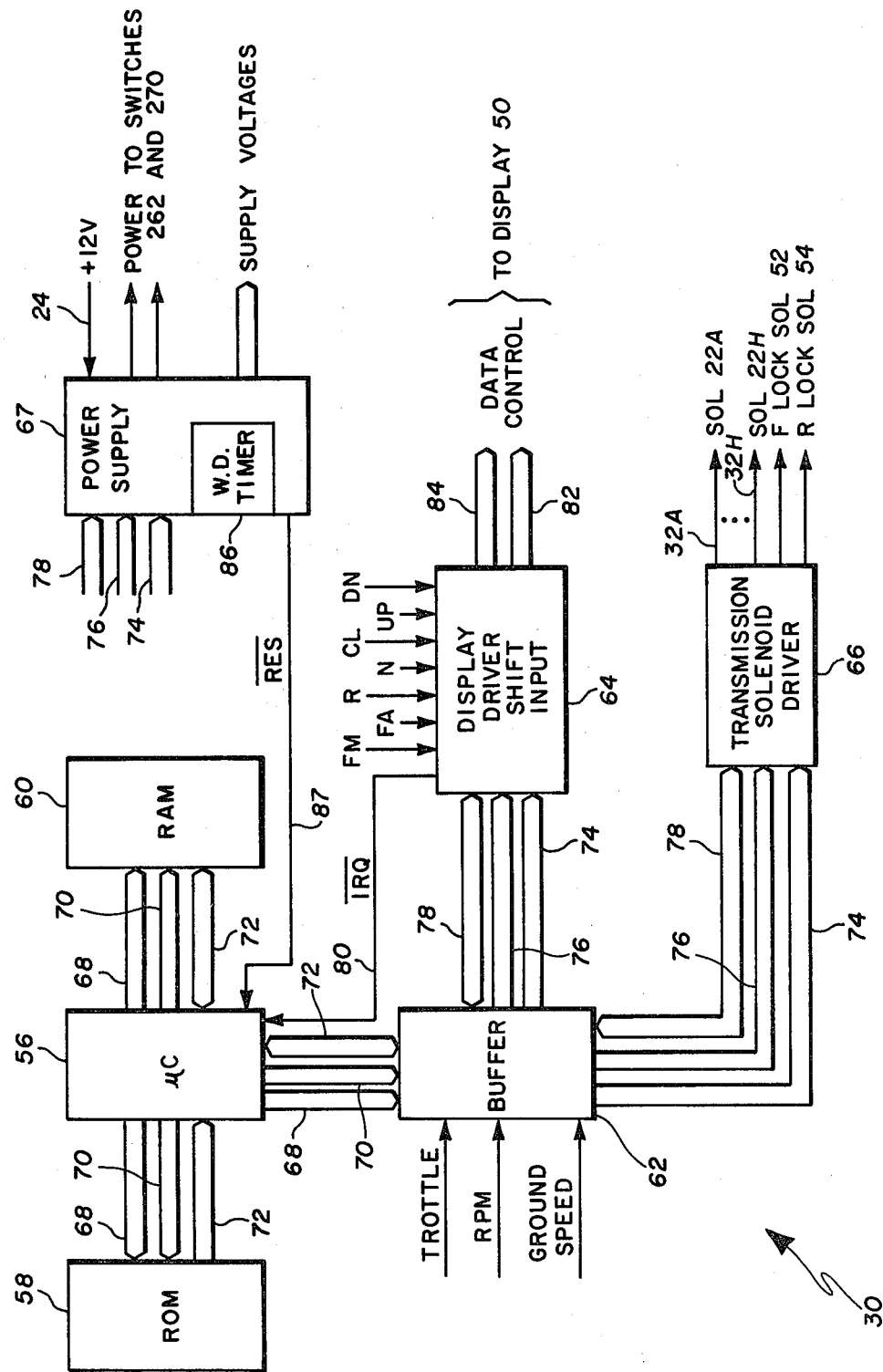

Control 30 (FIG. 2)

FIG. 2 is a block diagram of control 30 of FIG. 1. Control 30 includes microcomputer 56, read only memory (ROM) 58, random access memory (RAM) 60, buffer circuitry 62, display driver/shift input circuit 64, transmission solenoid driver circuit 66, and power supply circuit 67.

Microcomputer 56 communicates with and controls ROM 58, RAM 60, and buffer 62 through control lines 68, address bus 70, and data bus 72. Buffer 62 receives throttle position, RPM and ground speed input signals, as well as data from display driver/shaft input circuit 64 and transmission solenoid driver 66. Buffer 62 controls and communicates with display driver/shaft input circuit 64 through control lines 74, address bus 76, and data bus 78. In addition, display driver/shift input circuit 64 provides signals indicating that the position of mode select lever 35, pulser lever 37, or clutch pedal 48 has changed. Display driver/shift input circuit 64 also provides an interrupt signal (IRQ) to microcomputer 56 on interrupt line 80.

In one preferred embodiment of the present invention, the throttle position, RPM, and ground speed signals from sensors 40, 42 and 44, respectively, are initially received by signal processing circuitry (not shown) within power supply circuit 67. The signals are processed, converted to digital signals, and handed off to buffer 62. The throttle position signal from sensor 46 is an analog signal which is converted by an analog-to-digital converter within power supply circuit 67. The RPM and ground speed signals from sensors 42 and 44 are pulse signals of varying frequency. They are processed by a programmable timer module (PTM) within power supply circuit 67. After processing, all signals are presented to buffer 62 where they are manipulated by microcomputer 56.

Display driver/shift input circuit 64 provides control signals to display 50 by means of control lines 82 and data bus 84. In addition, display driver/shift input circuit 64 receives input signals from mode select control 34, upshift/downshift control 36, and clutch position sensor 46. The signals from mode select control 34 are labeled FM, FA, R and N, and indicate the mode selected by mode select lever 35. The signals from upshift/downshift control 36 are labeled UP and DN, and indicate an upshift or downshift as desired by the driver. The signal from clutch position sensor 46 indicates the position of clutch pedal 48, and is labeled CL in FIG. 2. Microcomputer 56 interrogates the status of these input signals through buffer 62.

Transmission solenoid driver circuit 66 receives signals from buffer 62 on control lines 74, address bus 76, and data bus 78. The outputs of transmission solenoid driver 66 provide grounds for solenoid valves 22A-22H. In a preferred embodiment in which eight individual solenoid valves 22A-22H are provided, transmission solenoid driver 66 provides an individual ground line 32A-32H to each of the eight solenoids 22A-22H, respectively. Three solenoids must be energized by ground connection in order to select a gear of transmission 20.

Transmission solenoid driver 66 also provides grounds for the front lock solenoid 52 and rear lock solenoid 54. The providing of grounds to energize solenoids 52 and 54 is also controlled by microcomputer 56 through buffer 62.

Transmission solenoid driver circuit 66 provides feedback signals to microcomputer 56 which indicate that the individual solenoids 22A-22H and their associated transmission solenoid driver circuits are functioning properly. Microcomputer 56 can check and interrogate the individual solenoid driver circuits by supplying address signals from buffer 62 to transmission solenoid driver circuit 66 on address line 76, providing control signals on control line 74, and monitoring the feedback signals from transmission solenoid driver circuit 66 which are provided on data bus 78 to buffer 62.

Power supply circuit 67 receives the +12 V input power from line 24 and provides the necessary supply voltages for the electronic circuitry of control 30. Power supply circuit 67 preferably includes watchdog timer 86, which prevents software excursions by microcomputer 56. This safety feature of the system is discussed in further detail later in this specification. Communication between microcomputer 56 and power supply circuit 67 is provided by means of buffer 62, control lines 74, address bus 76, data bus 78 and reset ($\overline{RES}$) line 87.

Figure 3:
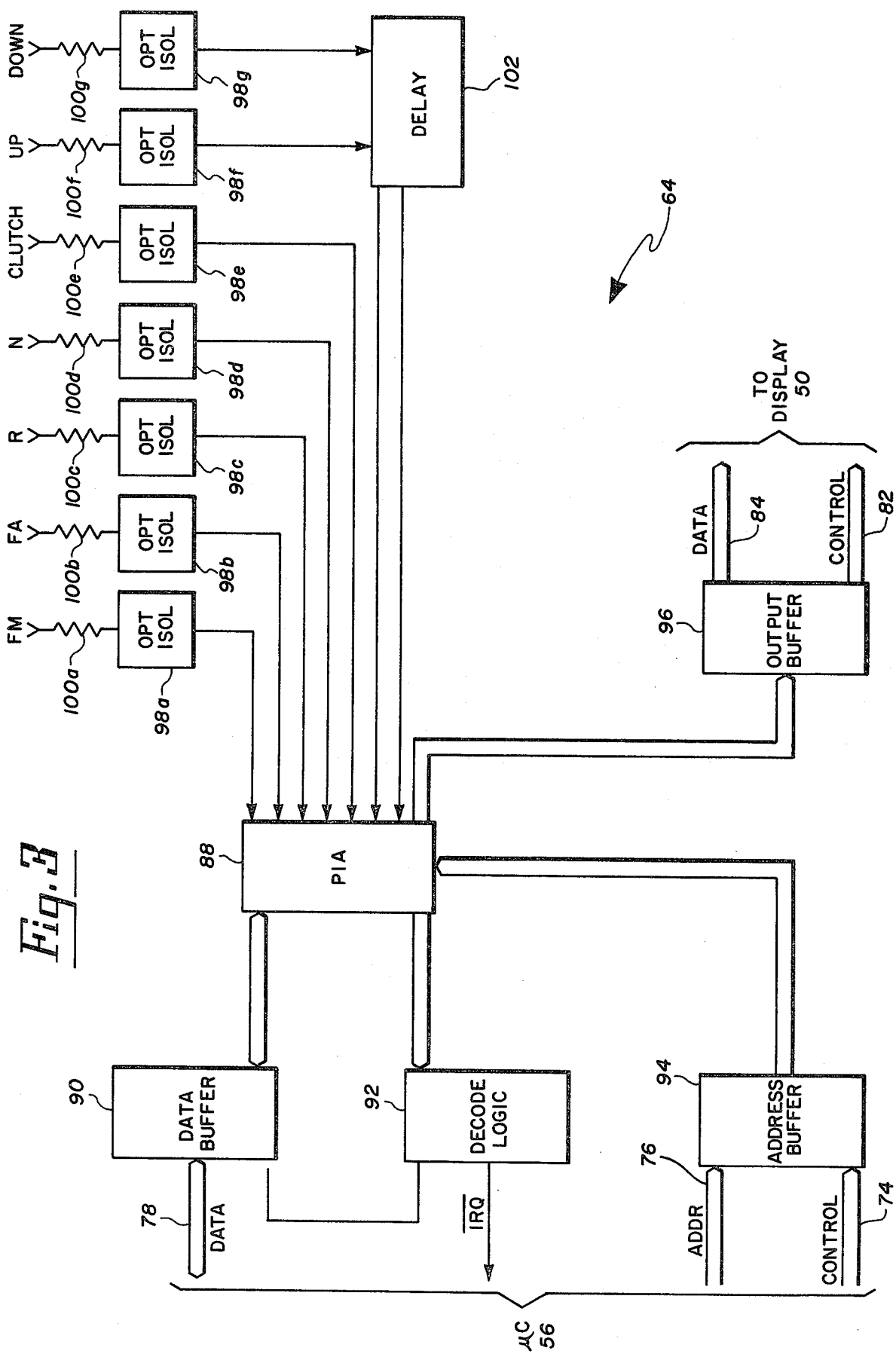

Display Driver/Shift Input Circuit 64 (FIG. 3)

FIG. 3 is an electrical block diagram of the preferred embodiment of display driver/shift input circuit 64 of FIG. 2. As shown in FIG. 3, circuit 64 includes programmable interface adapter (PIA) 88, data buffer 90, decode logic 92, address buffer 94, output buffer 96, optical isolators 98a-98g, input buffer resistors 100a-100g, and delay circuit 102.

Microcomputer 56 communicates with PIA 88 through data buffer 90, decode logic 92 and address buffer 94. Microcomputer 56 provides address and control information on address bus 76 and control lines 74 by means of buffer 62 shown in FIG. 2. Data to be displayed by display 50 is supplied on data bus 78 through data buffer 90, PIA 88, and output buffer 96 to display 50. Input signals from mode select lever 35, pulser lever 37, and clutch position sensor 46 are supplied to PIA 88 and are in turn supplied to buffer 62 by data line 78. Interrupt ($\overline{IRQ}$) line 80 indicates to microcomputer 56 that a change in the status of the input signal has occurred, and that microcomputer 56 should interrogate PIA 88 to determine the present status of the input.

As will be discussed in further detail later, the FM, FA and R signals from mode select control 34 are produced by Hall effect sensors, and are in the form of a current signal which is present as long as lever 35 is in that particular position. The N signal is preferably produced by a mechanical switch, which may be a part of neutral safety start switch 28, and is also a current signal which is present when lever 35 is in the neutral (N) position.

The FM, FA, R and N signals are supplied through resistors 100a-100d to optical isolators 98a-98d, respectively. At any time, only one of the four input current signals should be present. The outputs of optical isolator 98a-98d are normally high, and one of the outputs changes to a low state when the signal current is present. Thus the four inputs to PIA 88 from optical isolators 98a-98d should include three high signals and one low signal, the low signal corresponding to the particular position of mode select lever 34.

The signal from clutch position sensor 46 is a current signal which indicates whether clutch pedal 48 is in its normal position, or whether it has been depressed by the driver. The clutch signal is supplied through resistor 100e to optical isolator 98e. The output of optical isolator 98e is supplied to an edge sensitive input of PIA 88.

The output of optical isolator 98d is also supplied to an edge sensitive input of PIA 88. As a result, any change of the outputs of optical isolators 98d or 98e which indicates that the driver has moved lever 35 to the neutral (N) position or has depressed clutch 48 results in an immediate signal to microcomputer 56 by means of interrupt ($\overline{IRQ}$) line 80. This interrupt is provided because the driver expects that the actuation of the clutch 48 or the movement of lever 35 to neutral will result in immediate action. This immediate action is achieved by providing an interrupt signal to microcomputer 56 upon a change in state from high to low of the outputs of either optical isolator 98d or optical isolator 98e.

As will also be discussed in further detail later, upshift/downshift control 36 includes a pair of Hall sensors for providing the UP and DN signals. As long as lever 37 is held in the upshift position, a signal current is supplied through resistor 100f to optical isolator 98f. Similarly, as long as lever 37 is held in the downshift position, a signal current is supplied through resistor 100g to optical isolator 98g.

The outputs of optical isolators 98f and 98g are supplied to delay circuit 102. Delay circuit 102 acts as a hardware timer to establish a time period in which pulser lever 37 must continue to be held in the up or downshift position in order to produce another pulse. In one preferred embodiment, delay circuit 102 supplies input signals to edge sensitive inputs of PIA 88. When lever 36 is first moved to the upshift position, the output of optical isolator 98f changes, and delay circuit 102 provides a signal to PIA 88 which indicates a change in the upshift input signal. PIA 88 senses this signal transition, determines which input line has changed state, stores that information, and provides an interrupt to microcomputer 56. If lever 37 continues to be held in the upshift position for a predetermined time period (which in one preferred embodiment is about 728 milliseconds), delay circuit 102 provides another signal transition on lthe upshift input line to PIA 88. This results in PIA 88 again determining which line has changed state, storing that information, and providing an interrupt to microcomputer 56. This process will continue as long as pulser lever 37 remains in the upshift position.

Similarly, the movement of pulser lever 37 to the downshift position causes current to be supplied through resistor 100g to optical isolator 98g. Delay circuit 102 supplies a downshift input signal to PIA 88 which changes state in response to this change in the output of optical isolator 98g. PIA 88 detects the change in the downshift signal, stores this information and supplies an interrupt to microcomputer 56. If the downshift current input remains unchanged for longer than the predetermined time period, delay 102 again supplies a change in the downshift signal to PIA 88, which results in another interrupt to microcomputer 56.

Figure 4:
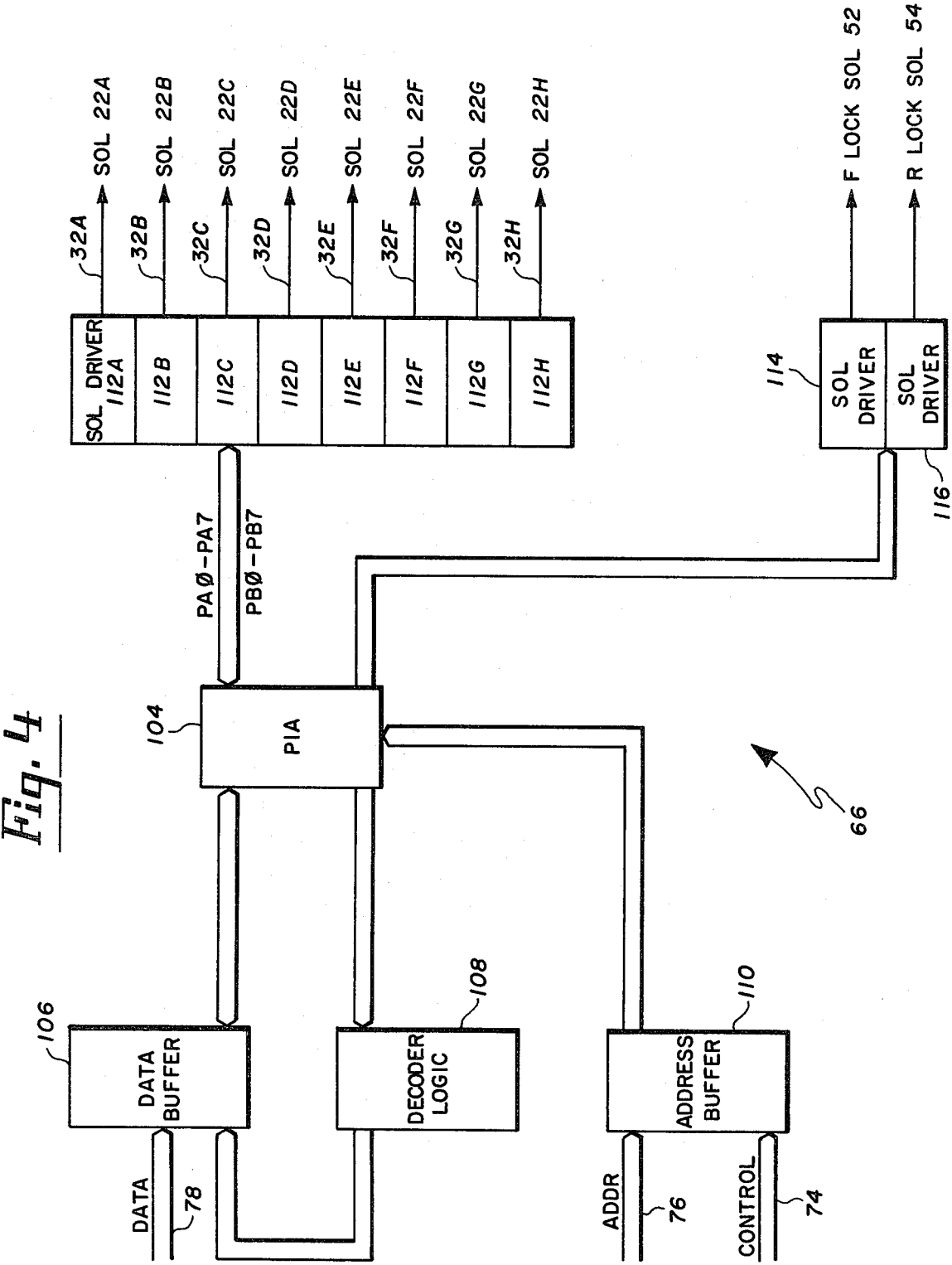

Transmission Solenoid Driver Circuit 66 (FIGS. 4 and 5)

FIG. 4 is a block diagram of transmission solenoid driver circuit 66. Circuit 66 receives information from microcomputer 56 through buffer 62 on control lines 74, address bus 76, and data bus 78. Circuit 66 includes PIA 104, data buffer 106, decoder logic 108, address buffer 110, transmission solenoid drivers 112A–112H, front lock solenoid driver 114, and rear lock solenoid driver 116.

FIG. 5 shows solenoid driver 112A. Each of the other solenoid drivers 112B–112H is identical to solenoid driver 112A, and therefore only solenoid driver 112A will be discussed in detail.

As shown in FIG. 5, solenoid driver 112 A includes drive transistor 118. In a preferred embodiment of the present invention, drive transistor 118 is a Darlington power transistor having its base terminal 118B connected through resistor 120 to the PBφ output port of PIA 104, its collector terminal 118C connected to solenoid ground control line 32A, and its emitter 118E connected to ground. In the preferred embodiment of the present invention in which drive transistor 118 is a Darlington transistor, drive transistor 118 has a gain of about 2200 and a 5 AMP output capacity, thereby providing, when turned on, sufficient current draw between collector 118C and emitter 118E to energize solenoid valve 22A.

Connected between collector 118C and emitter 118E are diode 122 and capacitor 124. Diode 122 provides backlash protection when drive transistor 118 is turned off, and capacitor 124 provides radio frequency interference (RFI) protection.

The solenoid drive circuit 112A of FIG. 5 also includes a feedback circuit by which PIA 104, and thus microcomputer 56, monitors operation of solenoid valve 22A and transistor 118. The feedback circuit includes optical isolator 126, which has an input connected through resistor 128 to collector 118C of drive transistor 118. An output of optical isolator 126 is connected to input port PAφ of PIA 104. Pull-up resistor 130 is connected between the output of optical isolator 126 and a positive potential $V_{CC}$. A power supply input of optical isolator 126 is connected to negative supply potential $V_{SS}$.

The feedback circuit permits monitoring of both the transmission solenoid 22A and drive transistor 118. When drive transistor 118 is turned off, the potential on line 32A should be 12 volts if transmission solenoid 22A is functioning properly. This 12-volt potential at line 32A permits a small trickle of current to flow through resistor 128 and into the input of optical isolator 126. This current flow is too small to actuate solenoid valve 22A, but is sufficient to energize optical isolator 126.

When drive transistor 118 is turned on by a signal supplied at output port PBφ, the potential on ground line 32A should be pulled to ground if drive transistor 118 is functioning properly. This will reduce the voltage at the input of optical isolator 126 to ground. Thus by knowing the state of the output at PBφ and monitoring the signal at input PAφ microcomputer 56 can determine whether solenoid valve 22A is functioning properly, and whether drive transistor 118 is functioning properly.

Solenoid drivers 114 and 116 shown in FIG. 4 also utilize Darlington drive transistors and flyback diodes similar to those shown in FIG. 5. In one preferred embodiment of the present invention, however, the feedback circuit utilized for solenoid drivers 112A–112H is not present, since it is less critical to know whether solenoid drivers 114 and 116 and forward and reverse lock solenoids 54 and 56 are functioning properly. Since the microcomputer 56 electronically prohibits a shift from forward to reverse, or vice versa, when ground speed is greater than one mile per hour, the forward and reverse lock solenoids 52 and 54 provide a redundant safety feature. The transmission control system will still operate, however, even if solenoid drivers 114 and 116 or solenoids 52 and 54 fail. For that reason, a feedback circuit to monitor these components is not required.

Display 50 (FIG. 6)

FIG. 6 is an electrical block diagram illustrating display 50 of the system of FIG. 1. Display 50 includes three 4-digit liquid crystal displays 132, 134 and 136. Display 132 provides a digital readout of engine RPM; display 134 provides a digital readout of ground speed in miles per hour or kilometers per hour; and display 136 provides a digital display of the maximum gear setting (if in automatic mode) and the current gear. Display drivers 142, 144 and 146 drive the individual displays 132, 134 and 136, respectively. Drive signals are supplied to drivers 142, 144 and 146 by buffer circuit 148 and decode logic 150. Microcomputer 56 controls the operation of display 50 through buffer 62 and display driver/shift input circuit 64. The control signals are supplied from display driver/shift input circuit 64 to buffer 148 by means of control lines 82 and data bus 84.

Mode Select Control 36 (FIGS. 7-9)

FIGS. 7, 8 and 9 illustrate the preferred embodiment of the mode select control 34 of the present invention. Mode select control 34 includes lever 35 which is pivotally mounted by gimbal assembly 152 to bracket 154.

The lower end of bracket 154 has an arc which matches the arc defined by the lower end of lever 35. Hall effect proximity switches 156, 158 and 160 are mounted by brackets 156a, 158a and 160a, respectively, to sense the position of magnet 162 which is carried by the lower end of lever 35. Hall effect switch 156 is positioned to indicate when lever 35 is in the reverse (R) position; Hall effect switch 158 is positioned to indicate when lever 35 is in the forward manual (FM) position; and Hall effect switch 160 is positioned to indicate when lever 35 is in the forward automatic (FA) position.

The neutral (N) position of lever 35 is sensed by neutral safety start switch 28, which is mounted by bracket 164 to bracket 154. Switch 28 is preferably a mechanical roller switch, and has a roller 28a which engages flange 165 carried by the lower end of lever 35 when lever 35 is in the N position. Neutral safety start switch 28 not only disconnects power to solenoid valves 22A–22H and supplies power to starter circuit as indicated in FIG. 1, but also provides the N signal to control 30.

Mode select control 34 also includes lock plate 166, which is shown in FIGS. 8 and 9. Lock plate 166 is mounted to bracket 154, and defines the FA, FM, N and R positions of lever 35. As shown in FIGS. 7 and 8, slot 168 in the lower end of lever 35 permits movement of lock plate engaging pin 170. Pin 170, which is carried by cylindrical pawl 171, is urged upwardly by spring 171a to engage lock plate 166, as shown in FIG. 8. When lever 35 is in the N position, pin 170 is positioned in positive latch stop 172 of latch plate 166. To move lever 35 in either direction, a push button (not shown) at the top of lever 35 must be depressed which applies a downward force through rod 173 to pawl 171 to move pin 170 out of latch stop 172. Ramped surface 174 is provided from latch stop 172 to positive stop 176, which defines the FM position. When lever 35 is in the FM position, it can be moved back to the N position without depressing the push button, due to ramp surface 174. In order to move lever 35 to the FA position, on the other hand, the push button must be depressed to move pin 170 out of engagement and past positive stop 176. The FA position is defined by absolute stop 178. A ramp surface 180 is provided between positive stop 176 and absolute stop 178, so that the driver can move the lever 35 from the FA position to the FM position without depressing the push button on lever 35.

On the opposite side of positive latch stop 172 is absolute stop 182, which defines the reverse position of lever 35. Ramp surface 184 is provided between absolute stop 182 and positive latch stop 172, thereby permitting movement of lever 35 from the reverse (R) to the neutral (N) position without requiring the operator to depress the push button.

Mode select control 34 also includes a forward and reverse lock out feature provided by forward lockout solenoid 52 and reverse lockout solenoid 54. Solenoids 52 and 54 are mounted on plate 186, which is attached to and extends downward from bracket 154. Plunger arm 52a of solenoid 52 is connected through link 188 to pivotable forward stop element 190. Stop element 190 is pivoted about pivot pin 192, and is biased against stop pin 194 by extension spring 196. In FIG. 7, solenoid 52 is illustrated in a deactuated state. Upon energization, solenoid 52 causes plunger 52a to move inward, thus pivoting stop element 190 in a clockwise direction. Upon deactuation of solenoid 52, extension spring 196 supplies a force to stop element 190 to pivot stop element 190 in a counterclockwise direction to the position illustrated in FIG. 7.

Similarly, solenoid 54 has a plunger 54a which is connected through connecting link 198 to pivotable reverse stop element 200. Stop element 200 is pivoted about an axis defined by pivot pin 202, and extension spring 204 applies a bias force tending to pivot the upper end of stop element 200 against stop pin 206. In FIG. 7, solenoid 54 is shown in an actuated state. When solenoid 54 is deactuated, extension spring 204 causes stop element 200 to pivot in a clockwise direction until it engages stop pin 206.

Forward and reverse stop elements 190 and 200 inhibit operation of lever 35 by selectively engaging one end of arm 208. As shown in FIG. 7, arm 208 is pivoted about an axis defined by pivot pin 210, and is linked to gimbal assembly 152 and lever 35 by connecting link 212 and arm 214. As shown in FIG. 7, forward lockout solenoid 52 is deenergized, while reverse lockout solenoid 54 is actuated. As a result, reverse stop element 200 is in a position which prevents rotation of arm 208 in a clockwise direction. Thus lever 35 is prevented from movement from neutral (N) to reverse (R).

Since forward lock out solenoid 52 is deenergized, forward stop element 190 is pivoted to a position which is out of the path of arm 208. The operator is permitted, therefore, to pivot lever 35 from neutral (N) position to the forward manual (FM) and forward automatic (FA) positions.

In the event that the vehicle is moving in a reverse direction at greater than the predetermined speed (for example one mile per hour), microcomputer 56 actuates solenoid 52 while leaving solenoid 54 deactuated. With solenoid 52 actuated and solenoid 54 deactuated, reverse stop element 200 is out of the path of arm 208, while forward stop element 190 is positioned in the path of arm 208. As a result, movement of lever 35 between the reverse (R) and neutral (N) positions is permitted, but movement from neutral (N) to either forward manual (FM) or forward automatic (FA) is prevented by stop element 190.

When the ground speed in either forward or reverse is less than the predetermined speed, both solenoids 52 and 54 are deactuated. In this condition, the operator can select any one of the positions of lever 35, since speed of the vehicle is so low that damage to transmission 20 would not result from a shift from reverse to forward, or vice versa.

In a preferred embodiment of the present invention, solenoids 52 and 54 are both actuated when the vehicle is not in use. This provides an anti-theft feature, since it prevents movement of lever 35 from the neutral (N) position. In this embodiment, microcomputer 56 deactuates lockout solenoids 52 and 54 only upon the driver meeting a security condition, such as inserting a key into a lock or entering a predetermined code into microcomputer 56.

Upshift/Downshift Control 36 (FIGS. 10–12)

FIGS. 10, 11 and 12 illustrate upshift/downshift control 36. As shown in FIGS. 10 and 11, pulser lever 37 is rotatably supported by gimbal assembly 220, which is supported by bracket 222. Mounted at the lower end of lever 37 are magnet 224 and flange 226. Hall effect proximity switches 228 and 230 are mounted to plate 222 by mounting brackets 232 and 234, respectively. When lever 37 is moved to the downshift position, magnet 224 is brought into proximity with Hall switch 228, which provides the downshift (DN) current signal to display driver/shift input circuit 64.

Similarly, when lever 37 is moved to the upshift position, magnet 224 is brought into proximity with Hall switch 230. This results in a production of an upshift (UP) current signal which is supplied to display driver/shift input circuit 64. As long as lever 37 remains in the upshift position, magnet 224 remains in proximity of switch 230, and the upshift (UP) current signal continues to be provided.

Lever 37 is biased to a normal position between the upshift and downshift positions by a lever centering device 236, which includes Y-shaped plate 238, bushing 240, torsion spring 242, and pins 244 and 246. Plate 238 is mounted to bracket 222 and supports bushing 240. Torsion spring 242 is mounted on bushing 240 and has a pair of upwardly extending arms 242a and 242b. Pins 244 and 246 extend between arms 242a and 242b and are connected to plate 238 and to gimbal assembly 220, respectively. The action of torsion spring 242 against pins 244 and 246 tends to return gimbal assembly 220 and lever 37 to a normal center position whenever lever 37 is released.

Pawl 247, which is movable within lever 37, carries pin 248 which extends out of slot 250 in lever 37. As shown in FIG. 11, pin 248 is biased upward by spring 252 to engage lock plate 254.

Lock plate 254 is shown in further detail in FIG. 12. The lower surface of lock plate 254, which engages pin 248, has a normal range 256 with shoulders 258 and 260 acting as positive stops for the downshift and upshift positions, respectively.

As described previously, upshift/downshift control 36 also provides a failsafe forward and failsafe reverse feature, which permits operation of the vehicle in an emergency, even if control system 30 fails or malfunctions.

The reverse failsafe feature is provided by roller switch 262, which is mounted to bracket 222 by bracket 264. When roller switch 262 is energized by power supply circuit 67 (FIG. 2) and is actuated by flange 226 engaging roller 266, it actuates selected solenoid valves from among valves 22A-22H to provide a reverse gear. This actuation of the solenoid valves is independent of microcomputer 56.

To obtain the reverse failsafe position, the driver must move lever 37 rearwardly until pin 248 engages stop 258, and then must depress push button 37a at the top of lever 37. When push button 37a is depressed, it applies a downward force to pawl 247 through rod 269. This permits pin 248 to move downward in slot 250 to clear stop 258 and move to a position defined by absolute latch stop 268 on lock plate 254.

Roller switch 270 provides a similar forward failsafe operation. Roller switch 270 is mounted to bracket 222 by mounting bracket 272, and is positioned to be actuated by flange 226 at the lower end of lever 37 when flange 226 engages roller 274. When actuated and energized (by power supply circuit 67), switch 270 actuates selected solenoid valves from among valves 22A-22H to provide a forward gear. As in the case of reverse failsafe operation, switch 270 provides forward failsafe operation independent of microcomputer 56.

To obtain the forward failsafe position, the driver moves lever 37 forward and depresses push button 37a in order to clear stop 260. Absolute latch stop 276 engages pin 248 and defines the forward failsafe position of lever 37.

Throttle Control 38 (FIGS. 13 and 14)

FIG. 13 shows throttle control 38, which includes throttle lever 39. Mounting bracket 280 supports gimbal assembly 282, in which lever 39 is supported. Lever 39 carries pin 284 in slot 286, which is positioned near the lower end of lever 39. The movement of pin 284, and thus the limit of movement of throttle lever 39, is defined by lock plate 288, which is shown in further detail in FIG. 14.

Throttle lever 39 is mechanically connected to throttle control cable 290 by arm 292 of gimbal assembly 282, linkage 294, and cable connector 296. Cable connector 296 is mounted on plate 298, which is attached to and extends downward from mounting bracket 280.

The position of throttle lever 39 is sensed by throttle position sensor potentiometer 40, which supplies a throttle position signal to microcomputer 56. Gimbal assembly 282 includes second arm 300 which is connected to arm 302 of potentiometer 40 by linkage 304. As throttle lever 39 is pivoted about the axis defined by gimbal assembly 282, movement of arm 300 causes a corresponding movement of arm 302, and thus a change in the resistance of potentiometer 40.

Figure 15:
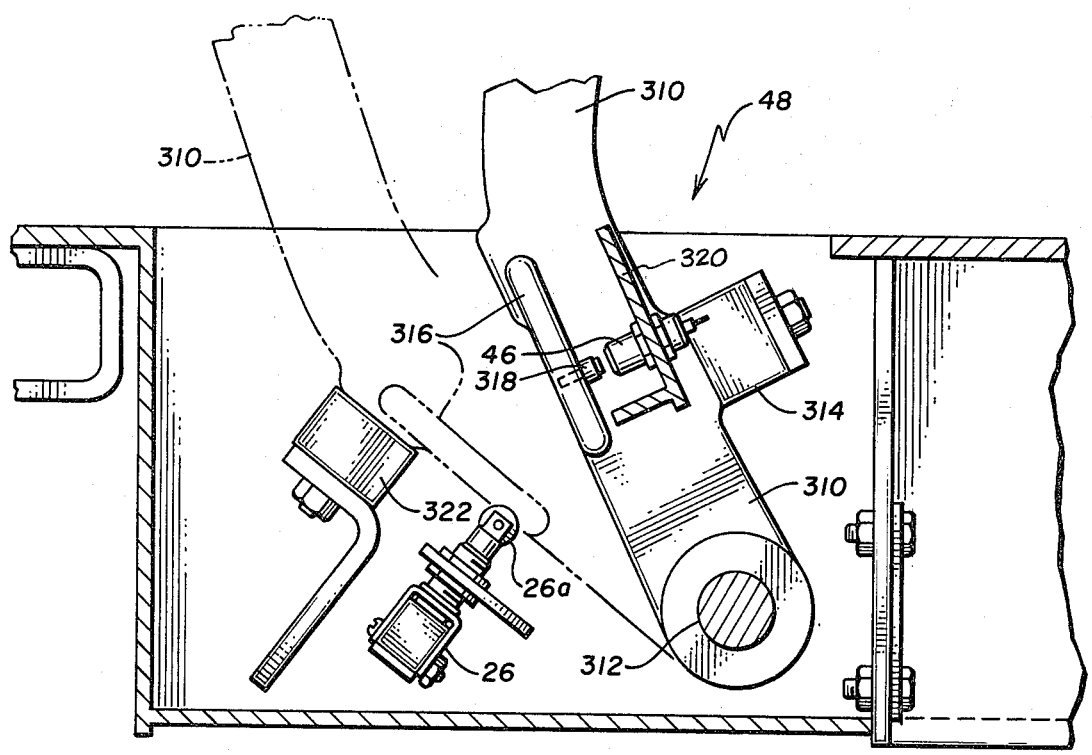
FIG. 15 illustrates the clutch of the transmission control system of FIG. 1.

Clutch 48 (FIG. 15)

FIG. 15 shows clutch assembly 48 used in a preferred embodiment of the present invention. In FIG. 15, clutch assembly 48 includes arm 310, which has a foot pedal (not shown) attached to its upper end. Arm 310 is mounted at its lower end to shaft 312 to permit rotation of arm 310 about the axis defined by shaft 312. A torsion spring assembly (not shown) mounted on shaft 312 normally biases arm 310 in a clockwise direction upward to a position defined by stop 314 (shown in solid lines in FIG. 15).

Arm 310 has an outward extending flange 316 which carries permanent magnet 318. Hall effect clutch position sensor 46 is mounted on bracket 320 so that magnet 318 is positioned adjacent Hall sensor 46 when clutch 310 is in its normal position.

When the driver depresses the clutch foot pedal, arm 310 begins to rotate in a counterclockwise direction about the axis defined by shaft 312. This causes magnet 318 to move away from Hall sensor 46, thus causing a change in the output of Hall sensor 46 as soon as the driver begins to depress the foot pedal.

The movement of arm 310 in the counterclockwise direction is limited by stop 322. When the clutch foot pedal is fully depressed (as shown in phantom in FIG. 15), flange 316 engages roller 26a of power switch 26. As has been discussed previously, power switch 26 is normally closed, thus permitting power to be supplied from +12 volt supply line 24 to solenoid valves 22A-22H (as best shown in FIG. 1). When flange 316 engages roller 26a, it causes power switch 26 to open, thus deenergizing solenoid valves 22A-22H and causing the transmission to switch to neutral.

Safety Features

The transmission control system of the present invention has several important safety features. First, the neutral (N) position of mode select lever 35 physically disengages power from solenoids 22A-22H by means of neutral safety start switch 28. As a result, the driver who pulls lever 35 to the neutral position is assured of getting neutral, regardless of decisions made by control 30, because power to solenoids 22A-22H is physically broken.

Second, depressing clutch 48 to the bottom of its travel physically disengages power from solenoids 22A-22H by means of normally closed switch 26. Once again, neutral is obtained independent of control 30. Even if neutral safety start switch 28 were to fail and control 30 were to fail or malfunction, neutral can still be obtained by the driver by depressing clutch 48 to the bottom of its travel.

Third, the forward failsafe and reverse failsafe positions of pulser lever 37 provide emergency operation of the vehicle independent of control 30. In the event of a detected hardware or software failure, power is supplied by power supply circuit 67 to switches 262 and 270, so as to permit operation of solenoid valves 22A-22H independent of control 30. This gives the driver the ability to move the vehicle even in the event of failure or malfunction of control 30 or some other portion of the transmission control system. In the preferred embodiments, operation in the forward failsafe and reverse failsafe modes can be modulated by operating clutch 48.

Fourth, in the preferred embodiments of the present invention, watchdog timer 86 (FIG. 2) does not allow software excursions. The program stored by ROM 58 has a start, an end, and an instruction body. At the end of the program, microcomputer 56 is instructed to return to the start of the program. Just before the end of the program, there is command to microcomputer 56 to reset watchdog timer 86. In the event that this reset does not occur, watchdog timer 86 times out, and provides a $\overline{\text{RES}}$ signal on line 87 which resets microcomputer 56. This causes microcomputer 56 to start at the beginning of the program again, and watchdog timer 86 is again restarted. When microcomputer 56 again reaches the end of the program, it should reset watchdog timer 86. Three consecutive failures by microcomputer 56 to reset watchdog timer 86 before it times out indicates a software excursion or other malfunction, and causes microcomputer 56 and the related circuitry to be turned off. In this situation, a relay in the power supply circuit 67 goes to a deenergized state which permits power to be provided to switches 262 and 270. This permits the forward failsafe or reverse failsafe operation by use of pulser lever 37.

Fifth, computer diagnostics are preferably provided with the transmission control circuit of the present invention. Microcomputer 56 interrogates and checks the function of ROM 58 and RAM 60, as well as the other hardware of control 30. This also includes a check by microcomputer 56 of each solenoid valve 22A-22H and solenoid driver 112A-112H by means of the feedback circuit shown in FIG. 5. In the event that a hardware failure is detected, microcomputer 56 displays a message on display 50 indicating to the operator that a hardware failure has occurred. In addition, if the hardware failure jeopardizes proper operation of the system control 30 is shut down and power is supplied to switches 262 and 270 to permit failsafe operation by means of pulser lever 37.

Sixth, as shown in FIG. 6, the testing of drive transistors 118 and solenoid valves 22A-22H continues throughout operation of the transmission control system. Each time the driver commands a gear change, microcomputer 56 makes that gear change and then verifies that only the three solenoid valves which were selected are turned on. In the event there is a discrepancy between the solenoid valves which should be actuated and those that actually are actuated, microcomputer 56 automatically switches the transmission to neutral and displays an error code on display 50.

Seventh, neutral safety start switch 28 ensures that the vehicle can only be started when mode select lever 35 is in the neutral (N) position.

Conclusion

The transmission control system of the present invention provides both manual and automatic control of an electrically controlled transmission. By the use of separate mode select and pulser levers 35 and 37, the transmission control of the present invention provides an extremely simple method by which the driver can upshift and downshift the transmission when in manual mode, and can select the maximum gear setting for the automatic mode. As discussed above, the transmission control system of the present invention also provides important safety features which prevent the vehicle from being operated under potentially unsafe conditions.

Although the present invention has been described with reference to preferred embodiments, workers will recognize that changes may be made in form and detail without departing from the spirit and scope of the invention.

What is claimed is:

1. For use in a vehicle having an engine and a transmission with a plurality of gear ratios which are individually selectable as a function of electrical transmission control signals, a transmission control system comprising:

manually operable mode select means for selecting one of a plurality of operating modes including a forward manual mode, a neutral mode, and a reverse mode, wherein the mode select means comprises:

a mode select lever having a forward manual position, a neutral position, and a reverse position; and lever position sensing means for providing signals to the control means indicative of the position of mode select lever;

manually operable upshift/downshift means separate from the mode select means for providing upshift and downshift electrical signals, the upshift electrical signal representing a requested increase in gear ratio and the downshift electrical signal representing a requested decrease in gear ratio, wherein the manually operable upshift/downshift means comprises:

an upshift/downshift lever having a normal position, an upshift position, and a downshift position;

means for providing the upshift signal in response to the upshift/downshift lever being in the upshift position; and means for providing the downshift signal in response to the upshift/downshift lever being in the downshift position; and control means for providing the electrical transmission control signals to select one of the plurality of gear ratios as a function of the operating mode selected and the upshift and downshift signals.

2. The invention of claim 1 wherein the transmission has a plurality of solenoid valves; wherein the gear ratio selected is a function of the solenoid valves which are actuated; and wherein the electrical transmission control signals cause actuation of selected solenoid valves.

3. The invention of claim 2 and further comprising: means for disconnecting power to the solenoid valves when the mode select lever is in the neutral position.

4. The invention of claim 1 and further comprising: ground speed sensing means for providing an electrical ground speed signal indicative of speed of the vehicle.

5. The invention of claim 4 and further comprising:
   forward lock means for physically engaging the mode select lever to prevent movement of the mode select lever to the reverse position when the ground speed signal indicates that the vehicle has greater than a predetermined forward speed; and
   reverse lock means for physically engaging the mode select lever to prevent the mode select lever from being moved to the forward manual position when the ground speed signal indicates that the vehicle has greater than a predetermined reverse speed.

6. The invention of claim 4 and further comprising:
   manually operable clutch actuator means mechanically linked in the transmission and movable by an operator for disengaging the engine from the transmission when actuated by movement from a normal unactuated position.

7. The invention of claim 6 and further comprising:
clutch position sensing means for sensing position of the manually operable clutch actuator means and providing a signal to the control means when the clutch actuator means is moved from its normal unactuated position.

8. The invention of claim 7 wherein the control means permits movement of the manually operable clutch actuator means to modulate the output of the transmission when the transmission is providing a selected gear ratio, and provides transmission control signals causing the transmission to select a neutral mode when the manually operable clutch actuator means is moved to an actuated position and the transmission is providing a gear ratio other than the selected gear ratio.

9. The invention of claim 8 and further comprising:
engine speed sensing means for providing an engine speed signal indicative of speed of the engine; and
wherein the control means provides transmission control signals to select a gear ratio when the manually operable clutch actuator means is deactuated which is a function of the ground speed signal and engine speed signal.

10. The invention of claim 8 and further comprising:
means for causing the transmission to be in a neutral mode irrespective of the transmission control signals when the manually operable clutch actuator means has a predetermined position.

11. The invention of claim 10 and wherein the manually operable clutch actuator means includes a foot operated clutch pedal, and wherein the predetermined position is when the clutch pedal is fully depressed.

12. The invention of claim 1 wherein the means for providing the upshift signal provides an upshift signal pulse in response to the upshift/downshift lever initially attaining the upshift position, and provides successive upshift signal pulses at selected time intervals so long as the upshift/downshift lever continues to be maintained in the upshift position; and wherein the means for providing the downshift signal provides a downshift signal pulse in response to the upshift/downshift lever initially attaining the downshift position, and provides successive downshift signal pulses at selected time intervals so long as the upshift/downshift lever continues to be maintained in the downshift position.

13. The invention of claim 12 wherein the control means, when the forward manual mode is selected, incrementally upshifts and downshifts the transmission between a lowest and a highest forward gear in response to the upshift and downshift signal pulses, respectively.

14. The invention of claim 1 wherein the upshift/downshift means further comprises:
bias means for biasing the upshift/downshift lever toward the normal position.

15. The invention of claim 16 wherein the normal position is intermediate the upshift and downshift positions.

16. The invention of claim 1 wherein the upshift/downshift lever further has a forward safety position and a reverse safety position, and wherein the invention further comprises:
forward safety means for providing electrical signals to the transmission to cause the transmission to select a predetermined forward gear ratio when the upshift/downshift lever is in the forward safety position, the predetermined forward gear ratio being selected independently of the control means; and
reverse safety means for providing electrical signals to the transmission to cause the transmission to select a predetermined reverse gear ratio when the upshift/downshift lever is in the reverse safety position, the predetermined reverse gear ratio being selected independently of the control means.

17. The invention of claim 16 wherein the forward and reverse safety means are normally deactivated when the control means is in operation, and wherein the forward and reverse safety means are activated when the control means is deactivated due to a malfunction.

18. The invention of claim 17 wherein the control means comprises:
programmed computer means responsive to signals from the manually operable mode select means and the manually operable upshift/downshift means;
means for providing the transmission control signals as a function of the signals from the computer means; and
watchdog timer means which is set by the computer means at the beginning of a sequence of operations, and is reset by the computer means at the end of the sequence of operations; and
means for deactivating the control means and activating the forward and reverse safety means in the event that the computer means fails to reset the watchdog timer means before a predetermined time period has elapsed a predetermined number of times.

19. The invention of claim 18 wherein the computer means interrogates and checks the function of the control means; and wherein the computer means causes the control means to be deactivated and the forward and reverse safety means to be activated in the event that a component of the control means has failed and jeopardizes proper operation of the control means.

20. The invention of claim 1 wherein the plurality of operarting modes includes a forward automatic mode; wherein, when the mode select means selects the forward automatic mode the control means provides transmission control signals to select one of the plurality of gear ratios as a function of a selected maximum gear ratio, a throttle position signal and an engine speed signal; and wherein the selected maximum gear ratio is selected by an operator of the vehicle by selecting the forward manual mode and operating the upshift/downshift means until the desired maximum gear ratio is attained, and then changing the selected mode from the forward manual mode to the forward automatic mode, and wherein the control means stores as the selected maximum gear ratio the gear ratio present when the forward automatic mode is selected.

21. The invention of claim 20 and further comprising:
display means for displaying, when the forward automatic mode is selected, the desired maximum gear ratio and the gear ratio selected by the control means.

22. The invention of claim 20 and further comprising:
manually operable clutch actuator means for modulating an output of the transmission.

23. The invention of claim 20 and further comprising:
throttle lever means being movable by an operator to control engine speed;
linkage means for linking the throttle lever means and the engine; and throttle position sensing means for providing the throttle position signal to the control means, the throttle position signal being indicative of the position of the throttle lever means.

24. The invention of claim 1 wherein the transmission has a plurality of solenoid valves, wherein the gear ratio selected is a function of the solenoid valves which are actuated; and wherein the control means comprises:
transmission solenoid driver means for providing the electrical transmission control signals to cause actuation of selected solenoid valves; and
computer means responsive to signals from the mode select means and the upshift/downshift means for providing signals to the transmission solenoid driver means to cause actuation of selected solenoid valves.

25. The invention of claim 24 wherein the transmission solenoid driver means includes a solenoid driver for each of the plurality of solenoid valves, each solenoid driver being actuated by a control signal from the computer means; and feedback means for providing feedback signals to the computer means indicative of the state of each of the solenoid valves.

26. The invention of claim 25 wherein the computer means determines, based upon the signals supplied to the transmission solenoid drivers and the feedback signals from the feedback means, whether the transmission drivers and the solenoid valves are operating properly.

27. For use in a vehicle having an engine and a transmission with a plurality of gear ratios which are individually selectable as a function of electrical transmission control signals, a transmission control system comprising:
ground speed sensing means for providing an electrical ground speed signal indicative of speed of the vehicle;
engine speed sensing means for providing an electrical engine speed signal indicative of the speed of the engine;
manually operable clutch actuator means mechanically linked to the transmission and movable by an operator for disengaging the engine from the transmission when actuated by movement from a normal unactuated position;
clutch position sensing means for sensing position of the manually operable clutch actuator means and providing a clutch position signal which indicates when the clutch actuator means is moved from its normal unactuated position; and
control means for providing transmission control signals to select one of the plurality of gear ratios, the control means receiving the clutch position signal, the engine speed signal, and the ground speed signal and providing transmission control signals which cause the transmission to select a gear ratio when the manually operable clutch actuator means moves from an actuated position to its normal unactuated position which is a function of the ground speed signal and the engine speed signal; wherein the control means permits movement of the manually operable clutch actuator means to modulate mechanically the output of the transmission when the transmission is providing a predetermined gear ratio, and provides transmission control signals which cause the transmission to select the neutral mode when the transmission is providing a gear ratio other than the selected gear ratio and the manually operable clutch actuator means is moved to an actuated position.

28. The invention of claim 27 and further comprising: display means for displaying the gear ratio selected by the control means.

29. The invention of claim 27 and further comprising: means for causing the transmission to be in a neutral mode irrespective of the transmission control signals when the manually operable clutch actuator means has a predetermined position.

30. The invention of claim 29 wherein the manually operable clutch actuator means includes a foot actuated clutch pedal, and wherein the predetermined position is when the clutch pedal is fully depressed.

31. For use in a vehicle having an engine and a transmission with a plurality of gear ratios which are individually selectable as a function of electrical transmission control signals, a transmission control system comprising:
operator control means for supplying input signals;
control means for providing transmission control signals to select one of the plurality of gear ratios as a function of the input signals;
safety override means being normally deactivated when the control means is in operation, and being activated when the control means is deactivated due to a malfunction; and
manually operable safety means for causing the safety override means, when activated, to provide electrical signals to the transmission to cause the transmission to select a predetermined gear ratio independently of the control means.

32. The invention of claim 31 wherein the manually operable safety means has a forward and a reverse safety position; and wherein the safety override means comprises:
forward safety means for providing electrical signals to the transmission to cause the transmission to select a predetermined forward gear ratio when the manually operable safety means is in the forward safety position; and
reverse safety means for providing electrical signals to the transmission to cause the transmission to select a predetermined reverse gear ratio when the manually operable safety means is in a reverse safety position.

33. For use in a vehicle having an engine and a transmission with a plurality of gear ratios which are individually selectable as a function of electrical transmission control signals, a transmission control system comprising:
manually operable throttle control means for controlling engine speed;
throttle position sensing means for providing an electrical throttle position signal indicative of the position of the throttle control means;
engine speed sensing means for providing an electrical engine speed signal indicative of the speed of the engine;
manually operable mode selecting means for selecting one of a plurality of operating modes including a forward manual mode and a forward automatic mode;
manually operable upshift/downshift means for providing upshift and downshift electrical signals, the upshift electrical signal representing a requested increase in gear ratio and the downshift electrical signal representing a requested decrease in gear ratio, wherein the manually operable upshift-/downshift means comprises:
upshift/downshift lever having a normal position, an upshift position, and a downshift position;
means for providing the upshift signal in response to the upshift/downshift lever being in the upshift position; and
means for providing the downshift signal in response to the upshift/downshift lever being in the downshift position; and
control means for providing the transmission control signal to select one of the plurality of gear ratios as a function of the electrical shift signals when the forward manual mode is selected, and for providing the transmission control signals to select one of the plurality of gear ratios as a function of a selected maximum gear ratio, the electrical throttle position signal, and the electrical engine speed signal when the forward automatic mode is selected, and wherein the selected maximum gear ratio is selected by an operator of the vehicle by selecting the forward manual mode and operating the upshift/downshift means until the desired maximum gear ratio is attained, and then changing the selected mode from the forward manual mode to the forward automatic mode, and wherein the control means stores as the selected maximum gear ratio the gear ratio present when the forward automatic mode is selected.

34. A transmission control system for controlling a transmission of the type having a plurality of solenoid valves, wherein the gear ratio selected by the transmission is a function of the solenoid valves which are actuated, the transmission control system comprising:
transmission solenoid driver means for providing electrical transmission control signals to cause actuation of selected solenoid valves;
control means responsive to the input signals for providing signals to the transmission solenoid driver means to cause actuation of selected solenoid valves as a function of the input signals;
feedback means for providing feedback signals to the control means indicative of the state of each of the solenoid valves; and
wherein the control means determines, based upon the signals supplied to the transmission solenoid driver means and the feedback signals from the feedback means, whether the transmission solenoid driver means and the solenoid valves are operating properly.

* * * * *